US008269590B2

(12) United States Patent
Bjerknes et al.

(10) Patent No.: US 8,269,590 B2
(45) Date of Patent: Sep. 18, 2012

(54) ROTARY TRANSFORMER (75) Inventors: Ole Johan Bjerknes, Oslo (NO); Svein Olaf Klemetsen, Horten (NO); Jon Liverud, Oslo (NO)

(73) Assignee: Aker Engineering & Technology AS, Lysaker (NO)

( * ) Notice: Subject to any disclaimer, the term of this patent is extended or adjusted under 35 U.S.C. 154(b) by 177 days.

(21) Appl. No.: 12/937,408

(22) PCT Filed: Apr. 14, 2009

(86) PCT No.: PCT/NO2009/000140
§ 371 (c)(1),
(2), (4) Date: Oct. 12, 2010

(87) PCT Pub. No.: WO2009/128724
PCT Pub. Date: Oct. 22, 2009

(65) Prior Publication Data
US 2011/0050377 A1 Mar. 3, 2011

(30) Foreign Application Priority Data

Apr. 14, 2008 (NO) .................................... 20081801

(51) Int. Cl.
*H01F 21/06* (2006.01)
(52) U.S. Cl. ...................................................... 336/130
(58) Field of Classification Search .......... 336/115–136, 336/178, 212
See application file for complete search history.

(56) References Cited

FOREIGN PATENT DOCUMENTS

| DE | 29503608 U1 | 9/1995 |
| DE | 19758213 A1 | 7/1999 |
| DE | 102006044704 A1 | 3/2008 |
| EP | 1742235 A2 | 1/2007 |
| NO | 165220 A | 1/1990 |
| WO | WO-2007/068278 A1 | 6/2007 |

OTHER PUBLICATIONS

Teske, Ekkehard, "International Search Report", for PCT/NO2009/000140 as mailed Jun. 26, 2009, 4 pages.

*Primary Examiner* — Tuyen Nguyen
(74) *Attorney, Agent, or Firm* — Winstead PC (57) ABSTRACT

A system for high power transmission on an installation comprising a first part (1, 11) and a second part (2, 12) rotating relative to each other characterized in that the system further comprising a rotary three-phase transformer having primary (U1, V1, W1) and secondary (U2, V2, W2) windings, the first part being provided with one of said primary (U1, V1, W1) or secondary (U2, V2, W2) windings, the second part being provided with the remaining winding of said primary (U1, V1, W1) or secondary (U2, V2, W2) windings, said primary (U1, V1, W1) and secondary (U2, V2, W2) windings are arranged to face each other, and an air gap (6) is provided between the primary (U1, V1, W1) and secondary (U2, V2, W2) windings and their corresponding parts of the transformer cores.

20 Claims, 8 Drawing Sheets

ROTARY TRANSFORMER

FIELD OF THE INVENTION

This invention relates to electrical power transmission on, to and/or from offshore vessels, and more particularly the present invention relates to electrical power transmission, e.g. on a weather vaning FPSO or wind turbine using a three phase rotary transformer.

BACKGROUND OF THE INVENTION AND PRIOR ART

The issue of climate and global warming is a hot topic nowadays. A Norwegian governmental report discussed aspects of the electrification of new and existing devices on the Norwegian continental shelf with power from the mainland that would reduce the green house gas emission form the petroleum sector. One type of offshore oil and gas installations that need to be electrificated are so called Floating Production Storage and Offloading (FPSO). The FPSO's can be divided in two main groups by their strategy for seaworthiness:
Ship shaped FPSO with a turret in order to enable mooring independent weather vaning.
Non weather vaning FPSO concepts that have a permanent mooring dependent heading.

A weather vaning FPSO is a vessel comprising a hull and a stationary turret. Today, the turret often has slip ring systems inside for transmission of electrical power. These electrical slip rings are usually air or oil insulated. One of the largest known slip ring based swivel in operation have an maximum power in the 40 MVA range, but they all have disadvantages of being subject to friction, wear, intermittent contact, and they have limitations on the currents and voltage levels that can be accommodated with the available space versus risk for electrical or mechanical damage.

Swivel technology exists today that can handle lower voltage levels and for relatively short distances, for example 10-30 km. The typical electrical power exchange limit for a ship shaped weather vaning FPSO designed for offshore co-generation has been identified to be in the 30 kV and 30 MW range, which often is a bit too low for several offshore installations today. These are some of the limitations that make it difficult to provide electrification of the FPSO's.

Today, the weather vaning FPSO (typically ship shaped) could generally have a power from shore or "next" neighbour power interface through the turret via a swivel arrangement. This is feasible for an up to 30 MW+ power export/import design with the 2007 technology status. If this system is operated around the 10-20 MW import level for most of the expected project life time it can bridge quite long distances, i.e. local offshore power generation corresponding with the offshore process heat demand. No local cogeneration, i.e. total electrification, with 36 kV power from a remote source could give cases with voltage instability.

For power transmission higher than 30 MW there are some limitations that can be defined as technology qualification needs mostly related to the electric ac-power swivel system design and further technology development, exceeding the typical IEC classification 18/30 (36) kV. For this, an electrical swivel design based on an EExp approach or similar, appear to be preferable.

The power and voltage level limits of an electrical power swivel on the turret can be avoided by installing a rotary transformer with the turret instead. The rotary transformer is a well known technique that has been present for many years, and has many different applications. As known by a person skilled in the art, a rotary transformer is utilized to couple electrical signals between two parts which rotate in relation to each other. Some examples of applications of rotary transformers are air-bag systems in cars, videocassette recorders (VCR), different types of electrical machines, spacecraft applications etc.

A similar problem is present in relation to wind turbines where the turbine as adapted to head toward the wind and thus be able to rotate relative to the vertical axis. Wind turbines can be located on shore or off shore. The choice of location is based on several parameters and a good location has a wide, open view and few obstacles. Most wind turbines have been placed on shore, but off shore locations have become more and more interesting. The winds off shore is generally less turbulent than on shore, and therefore are off shore wind turbines expected to have longer lifetimes than on shore wind turbines. As the world becomes more and more populated the lack of space is a problem regarding wind turbine locations. Thus, off shore locations are becoming even more preferable. An example of a off shore wind turbine park is the Horns Rev wind farm located 14 km from the west cost of the Danish Jutland, where the wind turbines are positioned in the sea ground. This wind farm has wind turbines of the type V80-2,0 MW from the Danish wind turbine production company Vestas. Vestas has also a mega Watt wind turbine called V90-3.0 MW, which was introduced in 2002. However, due to the increasing energy consumption, there is a future need for wind turbines producing even more power.

The existing types of wind turbines, such as for example the Vestas V80-2,0 MW wind turbine, have a high voltage transformer located in the back of the nacelle, which can add to a stability problem due to the large weight of the transformer placed in the top of a relatively high tower. Even though there has been a great reduction in weight of wind turbines during the last time period by for example using new lightweight materials, there is still a need for reduction of the weight of for example the nacelle. Off shore wind turbine parks can be positioned in the sea ground or on floating constructions. Wind turbines being floating, have several advantages relating to for example utilisation of the wind power compared to the non-floating wind turbines.

Today, wind turbines use a rotary unit for conversion of power and signals from the rotating wind turbine blades. Such a system for conversion of electrical power can be a slip ring system. A person skilled in the art will know that a slip ring system is an electromagnetic device allowing conversion of power from a stationary to a rotating structure or vice versa. One type of slip rings used in wind turbines are for example slip rings with fibre brush technology. Slip rings have disadvantages of being subject to friction, wear, intermittent contact, and they have limitations on the currents and voltage levels that can be accommodated with the available space versus risk for electrical or mechanical damage. So the increasing demand for power is difficult to provide with today's wind turbine technology.

The power and voltage level limits of today's wind mills can be exceeded by installing a three-phase rotary transformer with the wind turbine instead of for example the slip ring system. A rotary transformer is a well known technique that has been present for many years, and has many different applications. As known by a person skilled in the art, a rotary transformer is utilized to couple electrical signals between two parts which rotate in relation to each other. Some examples of applications of rotary transformers are air-bag systems in cars, videocassette recorders (VCR), different types of electrical machines, spacecraft applications etc.

The patent publication EP 1 742 235 A2 discloses an electrical power generator, such as a wind turbine comprising a rotary transformer. The rotary transformer transforms the power from the rotating frame of the generator to the stationary frame. In a multiphase power system there will be one rotary transformer for each phase. The transformers arranged coaxially in sequence and packaged as a single assembly. Each transformer has then two legs, so a three-phase system with three rotatary transformers will have six legs. The transformer core of the generator is constituted by soft iron. As known for a person skilled in the art, a soft iron transformer core is normally used for high frequencies, and not for power conversion due to, for instance, large losses and high temperature at high powers.

Norwegian Patent NO 165220 describes a rotating transformer based on a complicated system relying on load dependent torque, and will not be suitable for high power transmission systems.

Therefore, it is a need for technology development that provides solutions which reduces the green house gas emission by using alternative energy sources, and at the same time satisfies the world's increasing power demand and consumption. The new technology must exceed the existing limits of today's wind turbines regarding power and voltage range, and also avoid the use of slip rings. As wind turbines, driven by higher power ratings, grow bigger in magnitude, the weight of components placed ever higher above ground becomes critical. Solutions that, in a reliable manner, move mass downwards within the wind turbine are crucial in the development of larger wind turbines.

SUMMARY OF THE INVENTION

It is therefore an object of the present invention to review suitability of electrical power from shore for a weather vaning FPSO concept or alternatively electrical power exchange with other installations such as wind mills, including offshore wind turbines. It is another object to disclose a solution that contributes to reduction of green house emissions from offshore oil and gas installations. It is also an object of the present invention to improves today's technology and overcome its limitations so that it is possible to electrify FPSO installations that make them capable of handling future new tie-back fields with power from shore or "next" neighbourhood power cogeneration and exchange, as well as transmitting power generated by rotatable wind turbines.

The objects of this invention are obtained as described in the accompanying claims.

The objectives set forth above are achieved by providing, in a first aspect of the present invention, a system for high power transmission on a floating vessel, the floating vessel comprising a turret surrounded by a hull rotating relative to each other or a wind turbine rotating against the wind. The system further comprises a rotary three-phase transformer having and secondary windings. The turret is provided with one of said primary or secondary windings and the hull is provided with the remaining winding of said primary or secondary windings. Said primary and secondary windings are arranged to face each other. An air gap is provided between the primary and secondary windings and their corresponding parts of the transformer cores. With suitable corresponding transformer core designs this provides high power transmissions capable of handling future new tie-back oil and gas fields.

In an alternative embodiment of the system according to the present invention, the floating vessel is an offshore floating weather vaning vessel.

In yet an alternative embodiment of the system according to the present invention, the floating weather vaning vessel is a Floating Production Storage and Offloading-installation.

In yet an alternative embodiment of the system according to the present invention, the installation is a wind turbine adapted to be heading against the wind, and especially large offshore wind turbines.

In still an alternative embodiment of the system according to the invention, the primary windings and the associated parts of the transformer core(s) are mounted on a deck on the turret or on the rotating hull and the secondary windings and the associated parts of the transformer core(s) are mounted on a deck on the hull or on the turret opposite of the primary windings.

In a further alternative embodiment of the system according to the present invention, the rotary transformer is a transformer with cast resin windings or other dry cable winding technology. This is a safe technology compared to oil filled transformers regarding risk for explosion and oil leakages.

In still an alternative embodiment of the system according to the invention, tertiary windings of the rotary three-phase transformer are arranged on the turret or on the rotating hull.

In yet an alternative embodiment of the system according to the present invention the tertiary windings are mounted on a deck on the turret or on the rotating hull.

In an alternative embodiment of the system according to the present invention the three-phase rotary transformer is constituted by three one-phase transformers with vertical air gaps.

In further an alternative embodiment of the system according to the present invention the three-phase rotary transformer is constituted by three one-phase transformers with horizontal air gaps.

Electrical power transmission on, to and from weather vaning installations do often only face relatively slow movements with respect to compass point. Hence the transformer normally interfacing the regional power grid could be a standard transformer in combination with an electrical slip-ring system in order to enable free weather vaning. On the other hand slip-ring system limitations could be overcome by the use of a rotating transformer that should enable a more reliable system with less maintenance.

The use of rotating transformers typically relates to electrical power transmission on, to and/or from offshore vessels, and more particularly the present invention relates to electrical power transmission on a weather vaning vessel using a rotary transformer.

A weather vaning windturbine drive has similar requirements as a weather vaning ship shaped vessel with respect to external electrical power transmission interfaces. If a weather vaning windturbine drive is located offshore or on another quite inaccessible site a rotating transformer might be preferable due to inherent low maintenance requirements.

The typical electrical power export design requirement for an offshore windturbine drive is at present time expected to be most common around the 5 to 15 MVA range.

The typical electrical power import or export design requirement for an offshore weather vaning ship shaped vessel is at present time expected to be most common within the 10 to 100 MVA range The electric power import or export range with respect to distance favour higher voltage levels than what the available present state of well proven slip-ring technology offer, hence there appear to be a demand for other solutions.

Slow revolutions of the turntable in a wind turbine nacelle assembly or similarly movements related to a turret structure on a weather vaning ship shaped vessel could favour use of rotating transformer technology.

A rotating transformer with a vertical air-gap could be preferable technical design for a standard 3-phase power system could be a preferable design from a construction symmetry point of view with respect to the iron cores and the windings.

For a wind turbine housing that weather vane free or by active control a rotating transformer with a vertical air-gap could be installed fare down inside of the tower and still interface the wind turbine housing that weather vane. This transformer location could be suited for an oil-filled rotating-type interfacing voltage levels up to and around the 132 kV range.

For an offshore weather vaning ship shaped vessel a dry-type rotating-transformer design could be preferable with respect to the typical turret and swivel structures. "Cable based" windings could still enable interface voltage levels up to and around the 132 kV range suited for high power long distance import or export.

For an offshore weather vaning ship shaped vessel of the FPSO type the size of the turret including the production swivels and the preferred power and voltage levels, do call for a construction with doughnut sections assembled to rotating transformer in order to enable replacements of faulty parts within a normal offshore material handling philosophy.

An FPSO could also have use for single-phase or two-phase rotating transformers to interface direct electric heating systems associated with flow lines for oil and gas production.

BRIEF DESCRIPTION OF THE DRAWINGS

The invention will now be further described in more detail in the following detailed description by reference to the appended drawings in which.

DETAILED DESCRIPTION OF THE DRAWINGS

Figure 1:
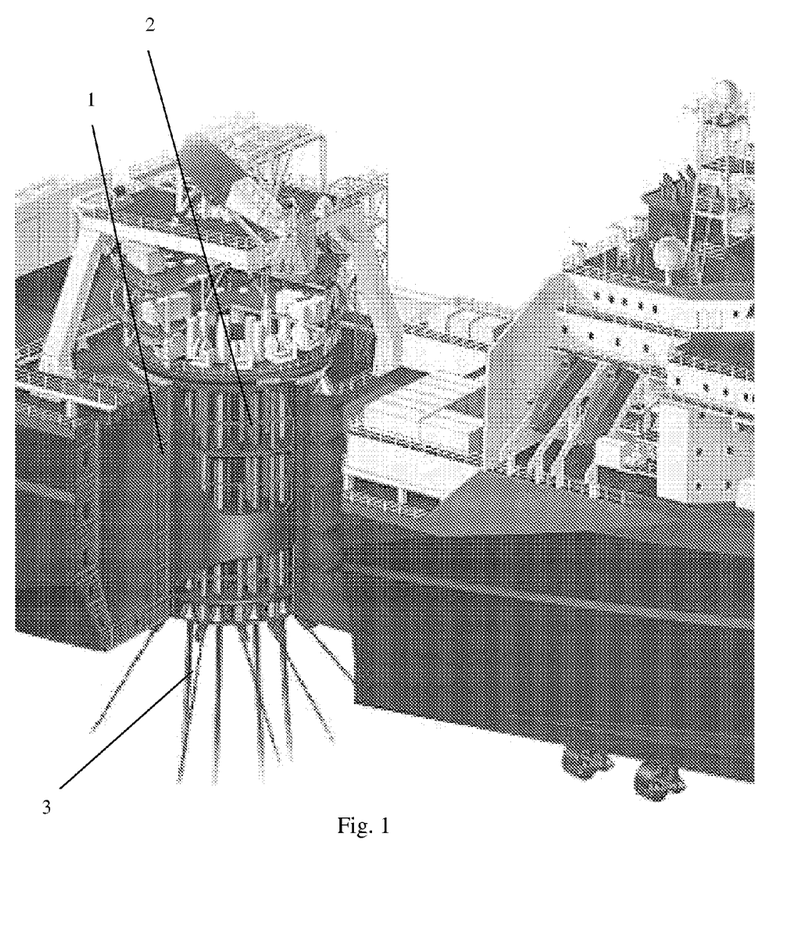
FIG. 1 illustrates a FPSO vessel.

As seen in FIG. 1, the weather vaning FPSO comprises a turret 2 surrounded by a hull 1. The turret 2 has typically a hole in the middle where risers, anchor lines etc. are positioned. The weather vaning FPSO will naturally move due to wind, ocean currents, waves etc., but the risers, anchor lines needs to be relatively stationary to avoid being tangled. Thus, the turret 2 is stationary and the hull 1 of the FPSO is rotating around the turret 2. There are different types of turrets 2, and an example turret is a Tentech turret as shown in FIG. 1.

As mentioned above, power and voltage level limits of the current technology that uses an electrical power swivel on the turret 2 can be avoided by installing a three-phase rotary transformer with the turret 2 on the FPSO instead—preferably a transformer with cast resin windings or other dry cable technology that does not require oil to cool and insulate a transformer with capabilities up to and including the 150 kV range. By using dry cable winding technology there will be no danger of oil leakage or risk of oil-mist explosions as with an oil filled transformer or oil filled slip ring swivel systems.

Figure 2:
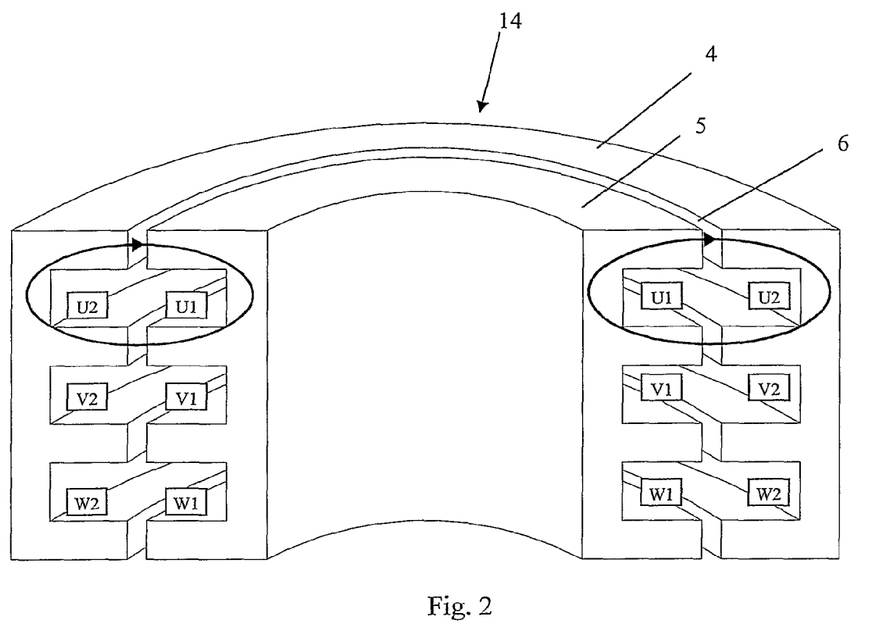
FIG. 2 illustrates the three-phase rotary transformer with vertical air gap.
Figure 3:
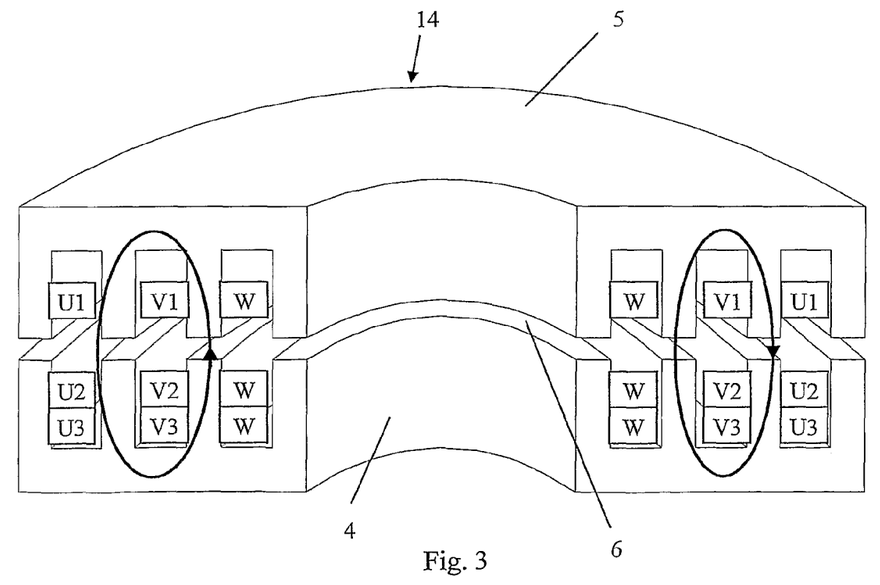
FIG. 3 illustrates the three-phase rotary transformer with horizontal air gap.

A transformer can have several galvanic separated windings or set of windings on a common iron core, and a rotary transformer has minimum two windings (one-phase) or two set of windings (three-phase) on a common iron core. The rotary transformer 14 installed on the FPSO is preferably a three-phase rotary transformer, with vertical or horizontal air gap 6. An example of a rotary transformer with vertical air gap 6 is illustrated in FIG. 2, and an example of a rotary transformer with horizontal air gap 6 is shown in FIG. 3. FIGS. 2 and 3 shows that the three-phase rotary transformer comprises a stator 5 which is the transformer part connected to the turret 2 and a rotor 4 which is the transformer part connected to the hull 1 of the FPSO. The rotor 4 is rotating freely relative to the stator 5. A vertical or horizontal air gap 6 is provided between the stator 5 and the rotor 4 that has no rotational torque. The size of the vertical or horizontal air gap 6 can vary and can for example be between 1 mm and 1 cm. The area and length of the vertical or horizontal air gap 6 determines the efficiency of the power transmission. The stator 5 has three primary windings U1, V1, W1 and the rotor has three secondary windings U2, V2, W2. When the rotor 4 is rotating relative to the stator 5, a magnetic field, indicated by an arrowed circle, is unaffected. The leak of the magnetic field is very small because the iron core encloses the windings completely. In this way, one limits or avoids unwanted magnetic fields other places in the vessel, for example such as unwanted heating of the hull 1. The core of the rotary transformer must be dimensioned and oriented so that the magnetic field can transmit power between the two rotating parts 4, 5 of the rotary transformer without a large loss in the air gap 6. It has no functional importance if the primary or the secondary windings are defined to be on the turret 2 or on the hull 1, and a tertiary set of windings U3, V3, W3 or more can be added on the turret 2 and/or on the hull 1 part of the rotary transformer on demand.

Figure 4:
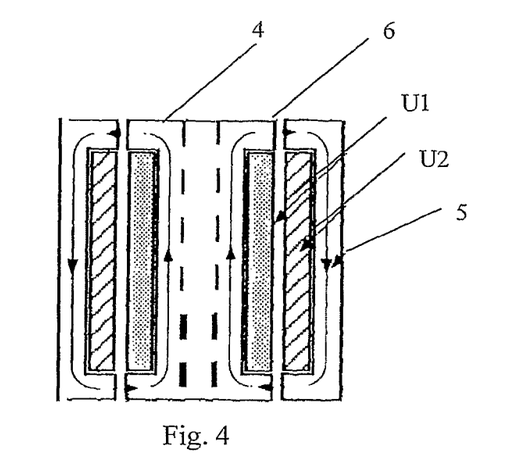
FIG. 4 illustrates a one-phase axial rotary transformer with vertical air gap.
Figure 5:
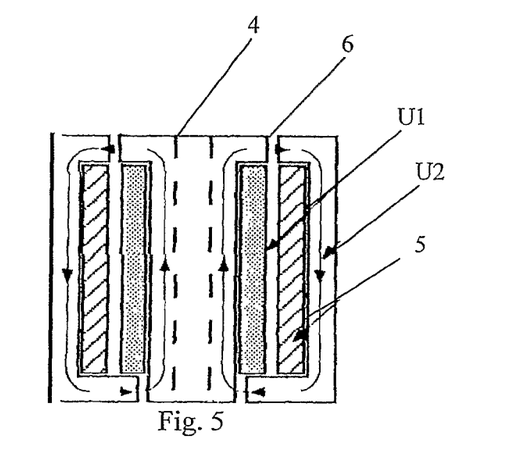
FIG. 5 illustrates a one-phase T-rotary transformer with vertical air gap.
Figure 6:
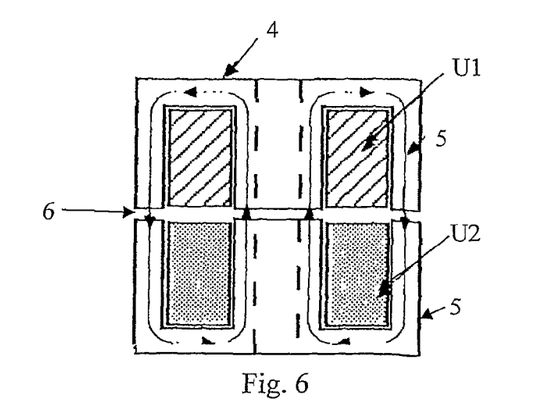
FIG. 6 illustrates a one-phase pot core rotary transformer with horizontal air gap.

The three-phase rotary transformer is principally constituted by three one-phase rotary transformers, but the three phase design traditionally enable weight and size reductions. There are several different types of one-phase rotary transformers, and three possible examples of one-phase rotary transformers can be seen in FIG. 4-6. The choice of type of one-phase rotary transformer is mostly a matter of the need for access and removal of the transformer. The t-rotary transformer shown in FIG. 5 has a t-shape that makes it easier to lift the transformer out than the axial rotary transformer shown in FIG. 4. The transformers shown in FIGS. 4 and 5 have a vertical air gap 6 and the transformer shown in FIG. 6 have a horizontal air gap 6. A typical rotary transformer design could also consist of a number of interconnected single phase transformers or only a singe phase unit. As mentioned previously, the number of windings/set of windings can increase to for example three or more windings/set of windings on a common iron core (i.e. a transformer with three or more windings/ set of winding). A turret design could include various rotary transformers for several purposes not limited to the following examples:

Electric power export or import, typically 3-phase at 50 or 60 Hz.

Dedicated power for direct electric flow-line heating, typically single-phase.

Dedicated power from a topside converter to a variable frequency drive subsea.

Dedicated power from a topside to a direct on line started drive subsea.

Electric power supply to a subsea distribution, typically 3-phase at 50 or 60 Hz.

Redundancy can be achieved by installing parallel units, typically 2×50 or 70%

Figure 9:
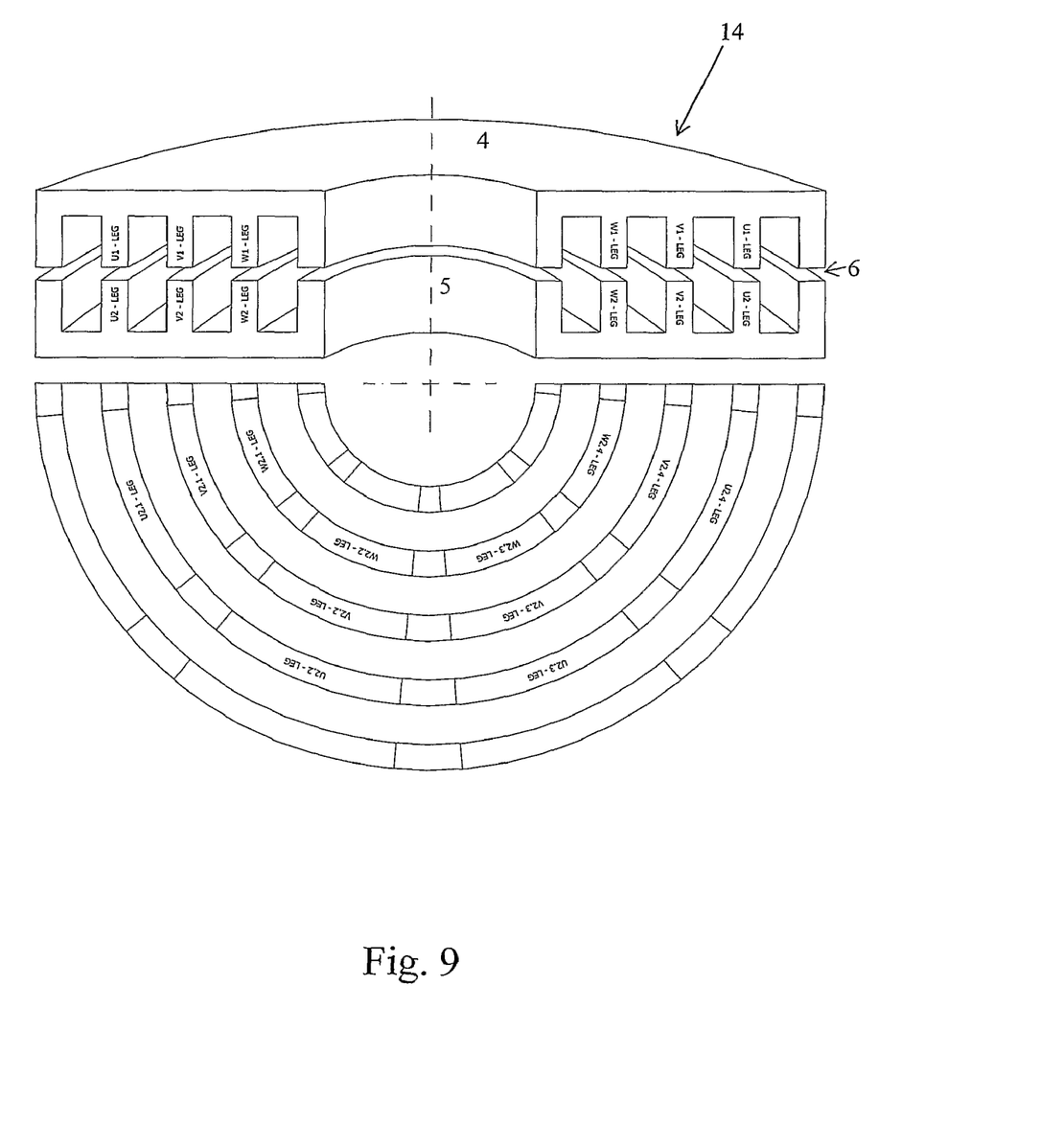
FIG. 9 illustrates an alternative construction of a three-phase rotary transformer with horizontal air gap.
Figure 10:
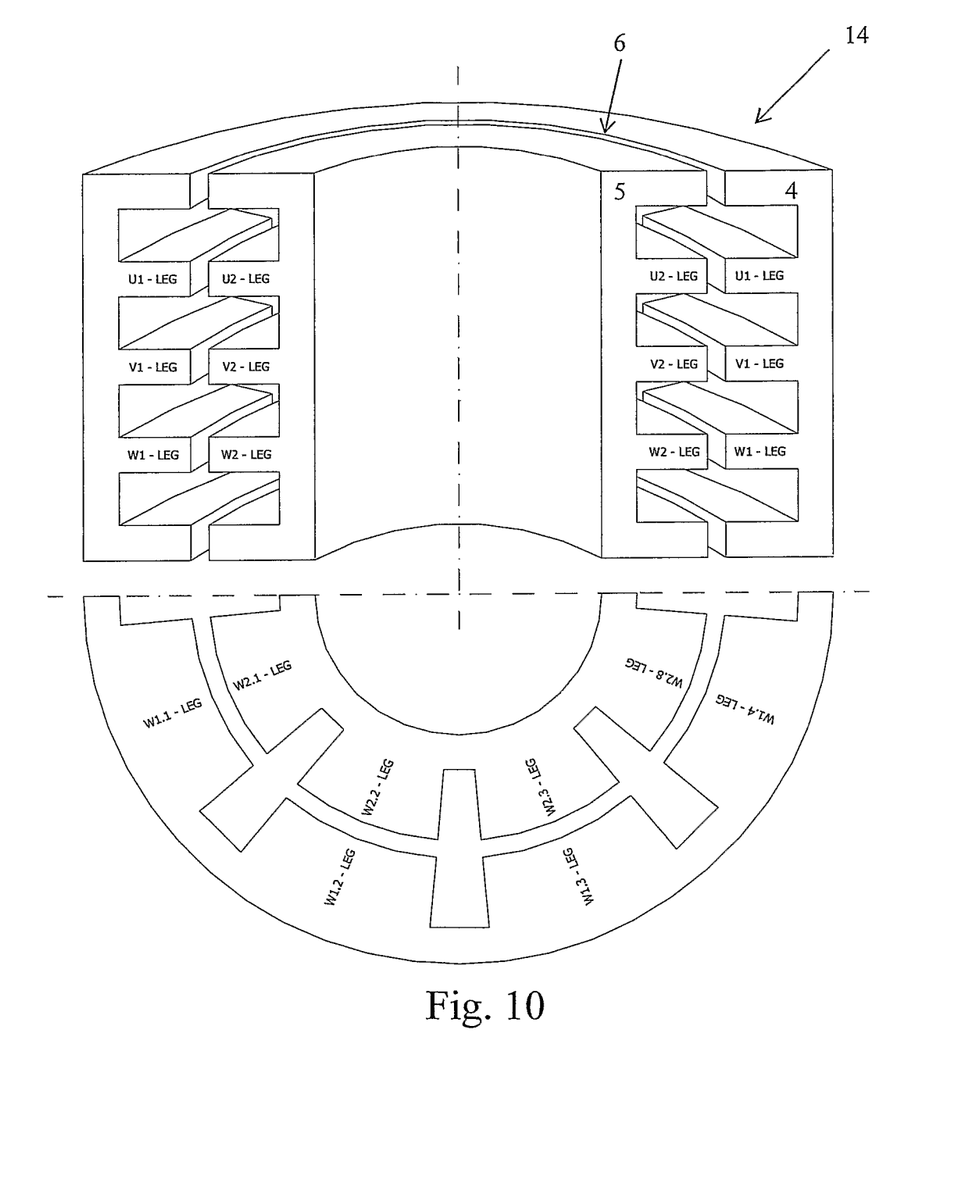
FIG. 10 illustrates an alternative construction of a three-phase rotary transformer with vertical air gap.

As mentioned above, the preferred embodiment includes a three-phase rotary transformer 14 which can have a vertical or horizontal air gap 6. An example of a three-phase rotary transformer 14 with vertical air gap 5 is illustrated in FIGS. 2 and 10, and an example of a three-phase rotary transformer 14 with horizontal air gap 6 is shown in FIGS. 3 and 9. The three-phase rotary transformer 14 can comprises primary windings U1, V1, W1 and secondary windings U2, V2, W2 and possibly tertiary windings U3, V3, W3. The primary windings U1, V1, W1 and their corresponding parts of the transformer cores are connected to the rotating (weather vaning) shaft 16 or to a brim in the nacelle 12, depending on the position of the three-phase rotary transformer 14. The secondary windings U2, V2, W2 and their corresponding parts of the transformer cores are connected to the stationary tower 11 of a wind turbine. The primary windings U1, V1, W1 are rotating freely relative to the secondary windings U2, V2, W2. The primary U1, V1, W1 and secondary U2, V2, W2 windings are arranged to face each other and magnetically link each other. FIGS. 2, 3, 9 and 10 are more detailed illustrations of the three-phase rotary transformer 14. The power in the three-phase rotary transformer 14 flows from the rotary part to the stationary part. Thus, the power can then be forwarded to an electrical grid or equivalent. As known for a person skilled in the art, it is common to define the primary windings as the side of the transformer where the power enters. With this definition, the power enters the primary windings U1, V1, W1 and goes out of the secondary windings U2, V2, W2. In for example a power plant, the voltage will be increased, and the primary windings U1, V1, W1 will be on the generator side of the transformer, i.e. the rotating element arranged to rotate with the nacelle 2 (shaft or brim). If the task of the transformer is to lower the voltage to a consumption level to provide power to a consumer, then the primary windings U1, V1, W1 will be on the grid side of the transformer and the secondary windings U2, V2, W2 will be on the consumer side of the transformer.

As seen in FIGS. 2, 3, 9 and 10, a vertical or horizontal air gap 6 is provided between the primary windings U1, V1, W1 the secondary windings U2, V2, W2 and the tertiary windings U3, V3, W3.

When the primary windings U1, V1, W1 are rotating relative to the secondary windings U2, V2, W2, a magnetic field, indicated by an arrowed circle, is unaffected. The leak of the magnetic field is very small because the iron core encloses the windings completely. Thus, one limits or avoids unwanted magnetic fields other places in the wind turbine, for example such as unwanted heating of the tower 11. The core of the three-phase rotary transformer 14 must be dimensioned and oriented so that the magnetic field can transmit power between the two rotating parts of the three-phase rotary transformer 14 without a large loss in the air gap 6.

Figure 7:
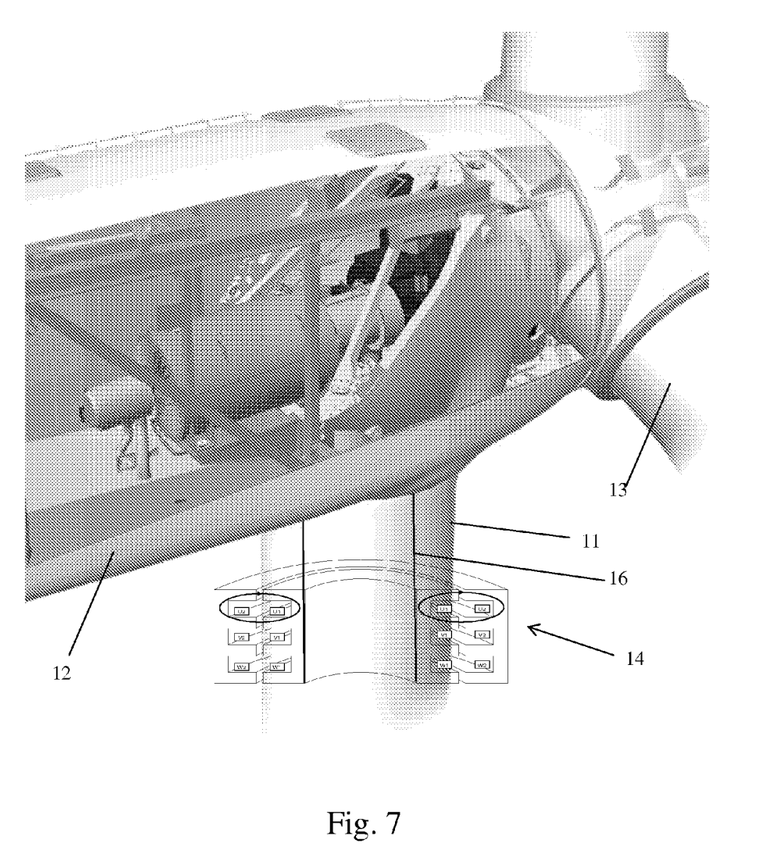
FIG. 7 illustrates a turret with a rotary transformer with vertical air gap.

A wind turbine have four basic components which can be seen in FIG. 7; a foundation unit (not shown), a tower 11, a nacelle 12 (also called turbine housing) and a rotor 13. The tower 11 carries the nacelle 12 and the rotor 13, and is the stationary part connecting the wind turbine to a foundation unit. The foundation unit can be placed for example on the ground or off shore. The tower 11 is also used to guide cables from the nacelle 12 down to an electrical grid. The nacelle 12 is arranged at the top of the tower 11 and the rotor 13 is arranged at the front of the nacelle 12. The nacelle 12 weather vanes by active control and comprises several components, such as for example axle, gear box, generator, control system etc. The rotor 13 comprises a hub, and at least one rotor blade is connected to the hub. The at least one rotor blade rotates when the wind is blowing. Nowadays, rotors 13 with three rotor blades are the most common design on wind turbines, but one bladed and two bladed wind turbines also exist. Due to stability issues, rotors 13 with an uneven number of blades are preferred. A tower 11 can have different heights, for example between 60 and 105 m. The rotor 13 can have a diameter between for example 80-90 m. The choice of tower 11 height and rotor 13 diameters is dependent on various parameters.

As illustrated in FIG. 7, a three-phase rotary transformer 14 is arranged in the wind turbine. Note that the three-phase rotary transformer 14 is not drawn in scale. A transformer can have several galvanic separated windings or set of windings on a common iron core, and a rotary transformer has minimum two windings (one-phase) or two set of windings (three-phase) on a common iron core. The common iron core comprises a pile of laminated tin plates for Eddy current limitation. As mentioned above, use of soft iron is another alternative construction of iron cores, but soft iron is normally used for high frequency and operates in the range of kilo Watts. At high power, the temperature in the soft iron increases and the soft iron can in some cases melt or burn. Soft iron has relatively large loss and is not very suitable to be use in power conversion to for example industrial power. However, a common iron core comprised of a pile of laminated tin plates does not have any issues regarding losses, and can also operate in the range of mega Watt without any problems regarding temperature or melting of the material. A common iron core comprised of a pile of laminated tin plates is more complex to manufacture than a soft iron core. The rotary transformer installed on the wind turbine is preferably a three-phase rotary transformer 14, with vertical or horizontal air gap 6.

Figure 11:
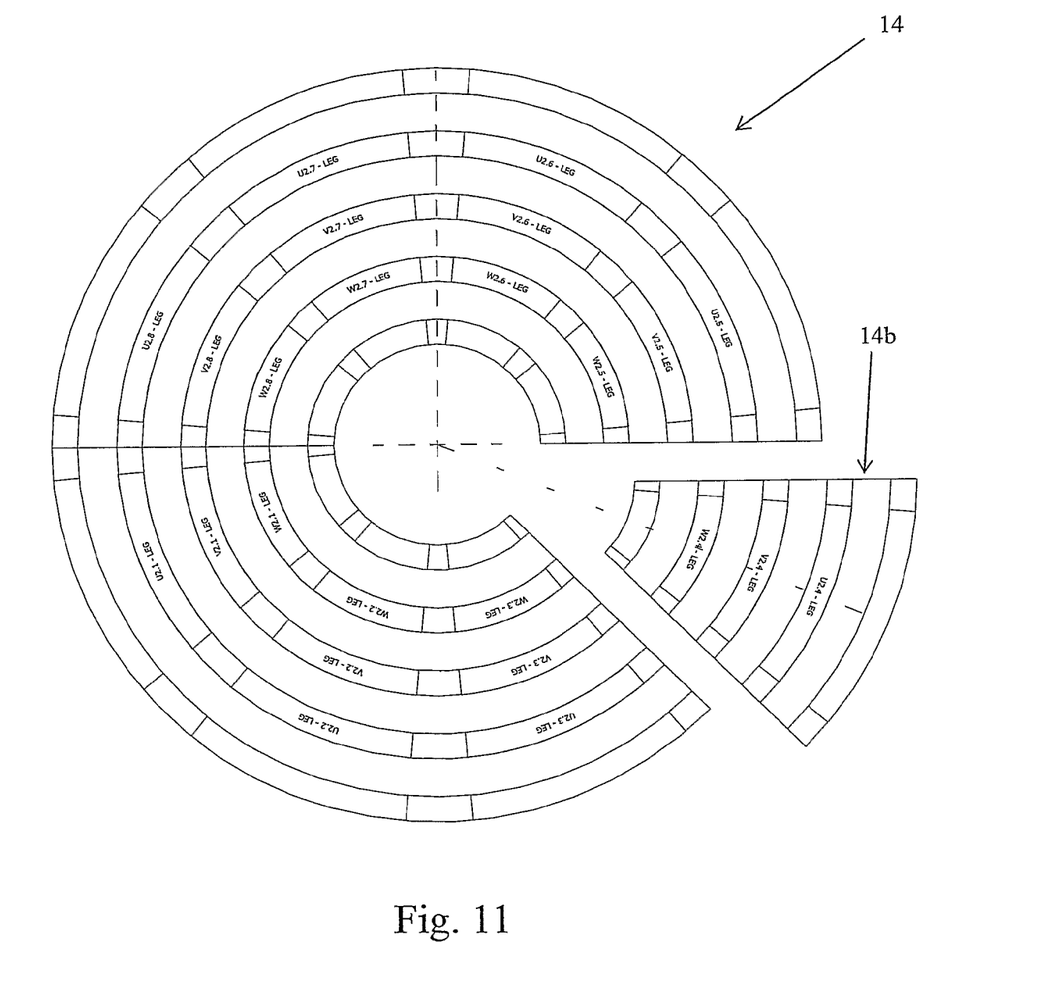
FIG. 11 illustrates a doughnut section of a three-phase rotary transformer with horizontal air gap.

As can be seen in the drawings, a three-phase rotary transformer 4 with a common iron core can have four legs or five legs as seen in FIGS. 9-11. This is a considerable smaller and lighter construction than for example three one-phase transformers arranged coaxially in sequence with separate iron cores which together has six legs.

The three-phase rotary transformer 14 can be placed in different positions inside the tower 11, but regardless of the position, one part of the three-phase rotary transformer 14 must be provided on a rotating element and the other part on a stationary element. The stationary element is naturally the tower 11, and the rotating element can be for example a shaft or a fastening brim on the nacelle 12. The choice of position depends on different parameters, but it can in principle be positioned anywhere in the tower 11. One parameter is the maintenance of the three-phase rotary transformer 14. If there is a large need of maintenance of the three-phase rotary transformer 14, it must be positioned so that it is easy to access. A suitable position with regards to easy maintenance is for example in the lower part of the tower 11. A rotary transformer is a relatively stable unit with a relatively low error rate, so the need for maintenance is relatively low. Another parameter is the available space in the tower 11. The upper part of the tower 11, close to the nacelle 12, has a diameter which is smaller than the lower part of the tower 11. Therefore, the upper part of the tower 11 can be too narrow to be able to fit the three-phase rotary transformer 14. The lower part of the tower 11 has a larger diameter, and has therefore more available space. In addition, a three-phase rotary transformer 14 can be relatively heavy, for example 10 tons, thus it is a complex operation to lift a 10 ton three-phase rotary transformer 14 up to the upper part of the tower 11, which for example can be 80-105 m high. In addition, stability is an issue in tall wind turbines, so by placing the heavy three-phase rotary transformer 14 in the lower part of the tower 11, the stability issue will be less critical. This may especially be important in offshore wind turbines.

Of course the rotary transformer shown in FIG. 7 can be placed in different positions on a turret 2 such as illustrated in FIG. 1. The choice of position depends on different parameters. One parameter is the maintenance of the rotary transformer. If there is a great need of maintenance of the rotary transformer, it must be positioned so that it is easy to access, for example on the top deck of the turret 2. However, the top deck of the turret 2 is not a completely free space because several devices and instruments are already mounted on that deck. Another parameter is the available space on the FPSO. The space between the turret 2 and the hull 1 (below the FPSO deck) is usually quite "empty", therefore it is convenient to place the rotary transformer there because it is an "empty", unused space. However, the access to the rotary transformer regards to maintenance is not so good as if it was placed on the top turret deck. A rotary transformer is a relatively stable unit with a relatively low error rate.

Figure 8:
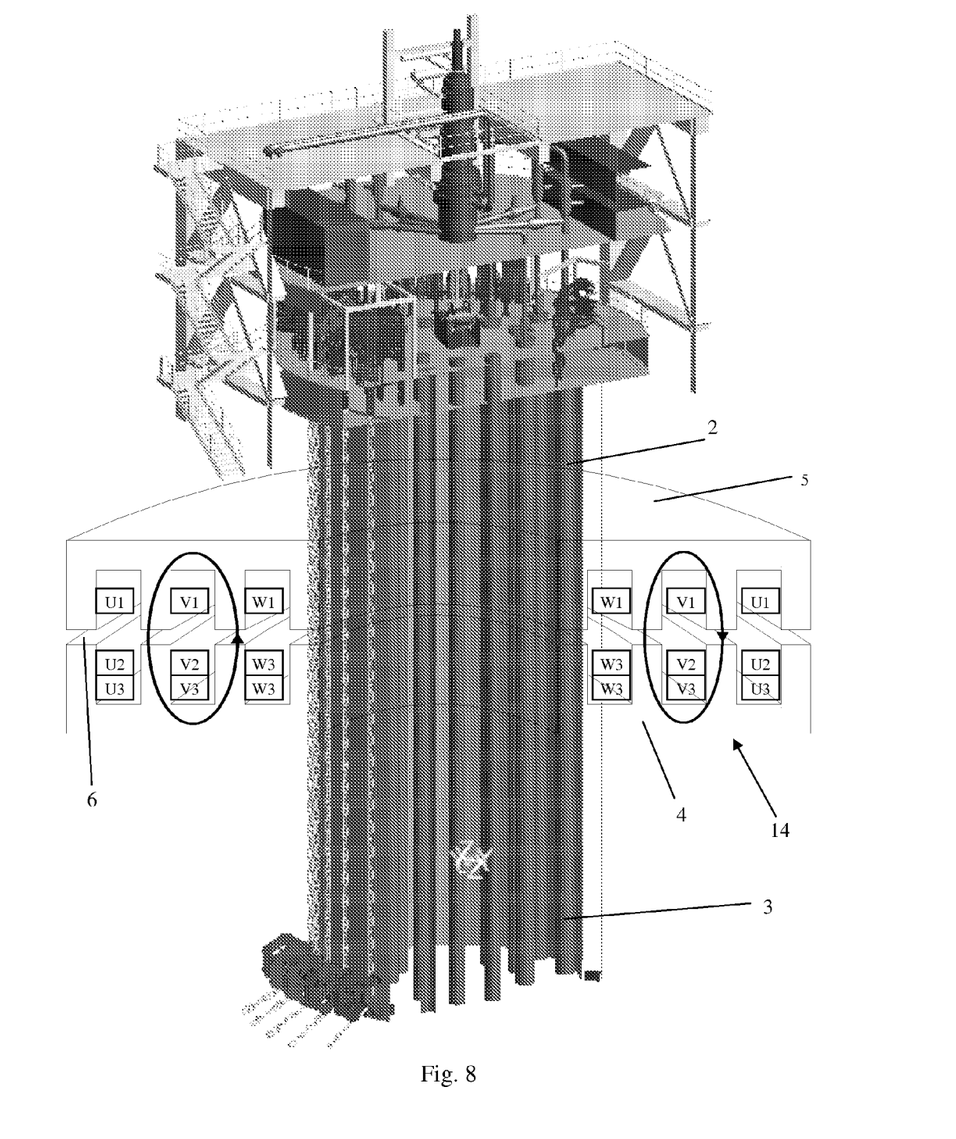
FIG. 8 illustrates a turret with a rotary transformer with a horizontal air gap.

FIG. 8 shows the rotary transformer with a horizontal air gap 6 positioned on the turret 2, but which also may be used in wind turbines. The rotary transformer has three sets of windings: primary windings U1, V1, W2, secondary windings U2, V2, W2 and tertiary windings U3, V3, W3. The windings are positioned circularly in the horizontal plane around the centre of the turret 2. As mentioned in FIG. 7 above, the size of the transformer is not drawn with correct proportions relative to the turret 2. The rotary transformer in FIG. 8 could typically be rated for 50-150 MVA.

The rotational diameter of the rotary transformer is in the same order of magnitude as the empty hole in the turret, and is also dependent on the type of turret 2. If the turret 2 is a small APL turret, the rotational diameter of the rotary transformer can for example be between 2 and 4 m, and for a large Tentech turret the diameter can be for example up to 20 m or more.

The turret 2 and the hull 1 are provided with transformer decks on which the rotor 4 and stator 5 of the rotary transformer are mounted.

The rotary transformer could typically have power in the range of 50-150 MVA, which is the range where most of the expected applications could operate. It can also be possible to extend this range to 25-250 MVA or to make smaller designs on demand.

Other possible constructions of the three-phase rotary transformer 14 are shown in FIGS. 9 and 10 which have better magnetic flux control than the constructions described above for FIGS. 2 and 3. FIG. 9 shows a three-phase rotary transformer 14 with a horizontal air gap 6 and FIG. 10 shows a three-phase rotary transformer 14 with a vertical air gap 6. The windings around the iron cores are identified as V2.1-LEG, V2.2-LEG etc. This construction of the three-phase rotary transformer 14 prevents the flux from the various phases to cancel out each other, and the first and fifth transformer leg give good control of the magnetic flux versus the surroundings. The windings V2.1, V2.2, . . . , V2.8 can be connected in series or in parallel. Similar connections should be used on both the primary U1, V1, W1, secondary U2, V2, W2 and tertiary U3, V3, W3 windings of the complete three-phase rotary transformer 14. Other multi-phased rotary transformers can be constructed by similar principles. These types of transformer constructions can be more flexible with respect to material handling than the construction types described earlier for FIGS. 2 and 3. The flexible material handling is due to that their construction, i.e. the iron core and the phase windings, can be split into doughnut sections. The handling of material is becoming more and more important with electrical power rating and required diameter of inner hole, so the embodiments of transformer construction showed in FIG. 9-10 are preferred.

A doughnut section 14a from the lower part of a three-phase rotary transformer 14 with five legs with a horizontal air gap 6 can be illustrated in FIG. 11. This way one or more sections of the transformer may be removed for service etc without removing the entire system. A similar solution is also possible with a vertical air gap transformer.

Thus to summarize the present invention relates to a system for high power transmission on an installation comprising a first part 1,11 and a second part 2,12 rotating relative to each other. The parts may be the hull and turret of a moored offshore installation which may rotate relative to each other, or a wind turbine where the nacelle on top of the wind turbine tower rotates relative to the tower, especially in offshore wind turbines. Other similar applications may also be contemplated requiring high power transmission between rotating parts.

The system further comprising a rotary three-phase transformer having primary U1, V1, W1 and secondary U2, V2, W2 windings, the first part being provided with one of said primary U1, V1, W1 or secondary U2, V2, W2 windings, the second part being provided with the remaining winding of said primary U1, V1, W1 or secondary U2, V2, W2 windings, said primary U1, V1, W1 and secondary U2, V2, W2 windings are arranged to face each other, and an air gap 6 is provided between the primary U1, V1, W1 and secondary U2, V2, W2 windings and their corresponding parts of the transformer cores. The air gap 6 will usually be horizontal or vertical depending on the application, and other possibilities may also be considered. Thus the primary windings may for example be coupled to the hull 1 of a ship or the shaft 16 from the nacelle 12 of a wind turbine while the secondary windings may be coupled to turret 2 around which the shop moves or the tower 11 supporting the nacelle 12. The position of the power transmission in the coupling between the two parts and the transformer 14 will depend on the required stability of the system. Thus the windings may be positioned at the end of the shaft 16 extending to the lower part of the tower 11 in an offshore wind turbine.

The invention claimed is:
1. A system for high power transmission on an installation comprising:
   a first part and a second part rotating relative to each other, wherein at least one of said first and second parts is anchored and the other part is allowed to rotate relative to the anchored part;
   a rotary three-phase transformer having primary and secondary windings;

wherein the first part is provided with a first transformer part comprising at least one of said primary or secondary windings;

wherein the second part is provided a second transformer part comprising remaining winding of said primary or secondary windings;

wherein said primary and secondary windings are arranged to face each other;

an air gap is provided between the primary and secondary windings and their corresponding parts of transformer cores;

wherein the first and second parts comprise a central opening having a chosen diameter; and wherein at least one of said first and second parts extends through the central opening.

2. The system according to claim 1, wherein a floating vessel is an offshore floating weather vaning vessel, wherein the first part and the second part are constituted by a rotating hull and a turret being able to rotate relative to each other.

3. The system according to claim 2, wherein the floating weather vaning vessel is a Floating Production Storage and Offloading-installation.

4. The system according to claim 2, wherein the primary windings and associated parts of the transformer core(s) are mounted on a deck on the turret or on the rotating hull and the secondary windings and associated parts of the transformer core(s) are mounted on a deck on the hull or on the turret opposite of the primary windings.

5. The system according to claim 1, wherein the rotary three-phase transformer is a transformer with cast resin windings or other dry cable winding technology.

6. The system according to claim 1, wherein tertiary windings of the rotary three-phase transformer are arranged on the first or second parts.

7. The system according to claim 6, wherein the tertiary windings are mounted on a deck on a turret or on a rotating hull of an offshore installation.

8. The system according to claim 1, wherein the rotary three-phase transformer is constituted by three one-phase transformers with vertical air gaps.

9. The system according to claim 1, wherein the rotary three-phase transformer is constituted by three one-phase transformers with horizontal air gaps.

10. The system according to claim 1, wherein the installation is a weather vaning wind turbine, wherein the first and second parts are constituted by a tower and a nacelle rotating relative to each other.

11. The system according to claim 10, wherein a rotating element is a shaft provided inside a length of the tower, wherein a first end of the rotating element is connected to the nacelle and a second end of the rotating element is connected to the one of the primary or secondary windings and their corresponding parts of the transformer cores.

12. The system according to claim 11, wherein the three-phase rotary transformer is arranged in a lower part of the tower.

13. The system according to claim 10, wherein a rotating element is a fastening brim provided on the nacelle for fastening of one of the primary or secondary windings and their corresponding parts of the transformer cores.

14. The system according to claim 13, wherein the three-phase rotary transformer is arranged in an interface between the nacelle and the tower.

15. The system according to claim 13, wherein the three-phase rotary transformer is arranged in an upper part of the tower.

16. The system according to claim 1, wherein the rotary three-phase transformer is an oil filled transformer.

17. The system according to claim 1, wherein the transformer cores comprise a pile of laminated tin plates for Eddy current limitation.

18. The system according to claim 1, wherein the system is operable to supply power to an electrical grid.

19. The system according to claim 1, wherein the system is intended for offshore applications.

20. A system for high power transmission on an installation comprising:

a first part and a second part rotating relative to each other;

a rotary three-phase transformer having primary and secondary windings;

wherein the first part is provided with a first transformer part comprising at least one of said primary or secondary windings;

wherein the second part is provided with a second transformer part comprising remaining winding of said primary or secondary windings;

wherein said primary and secondary windings are arranged to face each other;

an air gap is provided between the primary and secondary windings and their corresponding parts of transformer cores;

wherein the first and second transformer parts comprises at least one removable section, said at least one removable section comprising transformer legs with corresponding windings; and wherein the primary and secondary windings comprise a number of separate windings on said at least one removable section.

* * * * *